United States Patent
Buban (10) Patent No.: US 10,721,177 B2
(45) Date of Patent: *Jul. 21, 2020

(54) COMPLETION-SIDE CLIENT THROTTLING

(71) Applicant: Microsoft Technology Licensing, LLC, Redmond, WA (US)

(72) Inventor: Garret Buban, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/282,776

(22) Filed: Feb. 22, 2019

(65) Prior Publication Data
US 2019/0190842 A1    Jun. 20, 2019

Related U.S. Application Data

(63) Continuation of application No. 15/423,959, filed on Feb. 3, 2017, now Pat. No. 10,250,517.

(51) Int. Cl.
*H04L 12/875* (2013.01)
*H04L 29/06* (2006.01)
*G06F 9/50* (2006.01)

(52) U.S. Cl.
CPC ............ *H04L 47/564* (2013.01); *G06F 9/505* (2013.01); *H04L 67/42* (2013.01); *G06F 2209/504* (2013.01)

(58) Field of Classification Search
CPC ............... H04L 67/325; H04L 41/5003; H04L 41/5009; H04L 47/12; H04L 47/28
See application file for complete search history.

(56) References Cited

U.S. PATENT DOCUMENTS 10,250,517 B2 * 4/2019 Buban .................. H04L 47/564

* cited by examiner

*Primary Examiner* — Marsha D Banks Harold
*Assistant Examiner* — Elton Williams
(74) *Attorney, Agent, or Firm* — Alleman Hall Creasman & Tuttle LLP (57) ABSTRACT

A computing device comprises a processor and memory. A throttling application stored in the memory that is executed by the processor is configured, in response to a new server request from a first application, to determine whether performing the new server request exceeds a predetermined number of requests in progress; if performing the new server request does not exceed a predetermined number of requests in progress, estimate a completion time for the new server request; insert the new server request and the completion time in a request queue; and send the new server request and a time to live field to a server, wherein the time to live field is equal to the completion time minus a current time that the new server request is sent to the server.

20 Claims, 7 Drawing Sheets

COMPLETION-SIDE CLIENT THROTTLING

CROSS REFERENCE TO RELATED APPLICATIONS

This application is a continuation of U.S. patent application Ser. No. 15/423,959, filed Feb. 3, 2017, the entire contents of which is hereby incorporated herein by reference for all purposes.

FIELD

The present disclosure relates to client-server networks, and more particularly to completion-side throttling in client-server networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Figure 1:
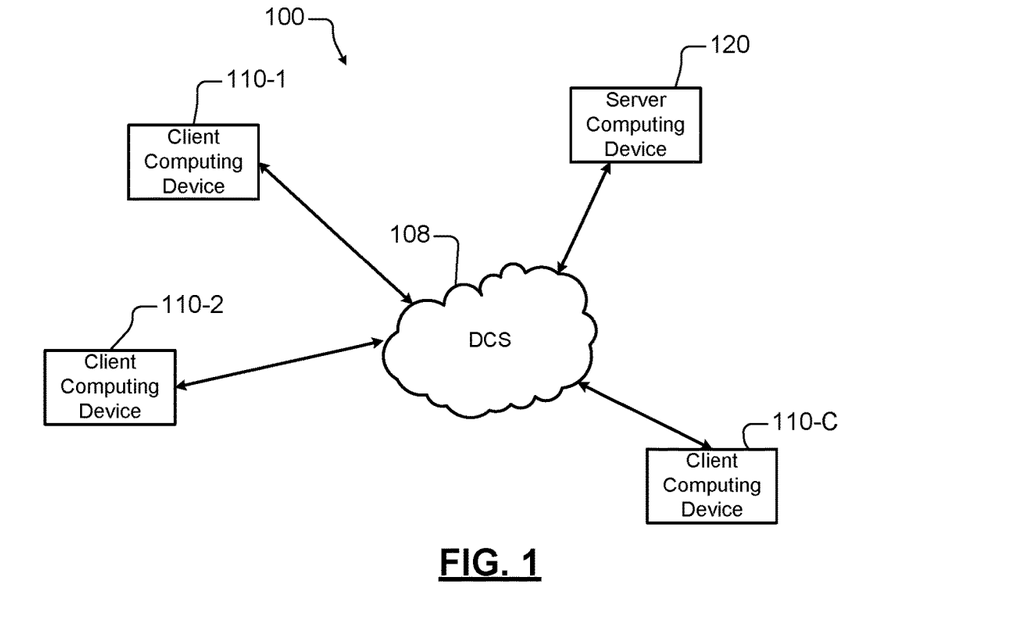
FIG. 1 is a functional block diagram of a client-server network according to the prior art.

Referring now to FIG. 1, in a client-server network 100, a plurality of client computing devices 110-1, 110-2, . . . , and 110-C (collectively client computing devices or clients) communicates with a server computing device or server 120 via a distributed communications system (DSC) 108 such as the Internet or via a communication bus of a device, a local network, etc. Tasks or workloads are partitioned between the servers 120 (as providers of a resource or service) and the clients 110 (as service requesters). The servers 120 typically have a one to many relationship with the clients 110.

Client/server networks may use throttling mechanisms to limit performance based on a service level agreement (SLA) sold to a customer. Throttling mechanisms may also be used to prevent the client 110 from overloading the server 120 with too much work. Traditionally, this throttling is done on the request side of the client-server network 100. If the client 110 is trying to do more work than the throttle will allow, the client 110 is prevented from sending a new request.

When using request-side throttling, one of the clients (e.g. 110-1) has no knowledge of what the other clients (e.g. 110-1, . . . , 110-V) are doing. As such, the requests can needlessly collide and the overall efficiency of the client-server network 100 is reduced. In another example, two of the clients (e.g. 110-1 and 110-2) are both holding back requests in order to enforce their respective throttles. However, the server 120 is idle. Then the two clients 110-1 and 110-2 send requests to the server 120 at the same time. The server 120 receives both requests simultaneously. As such, one request must be delayed while the other request is processed.

In some examples, the clients 110 use a more advanced protocol in which the clients 110 ask for permission to send a request. The clients 110 then send the request when permission is granted by the server 120. However, this approach requires extra overhead relating to the request and the grant or denial of permission.

SUMMARY

A computing device comprises a processor and memory. A throttling application stored in the memory and is executed by the processor is configured, in response to a server request from a first application, to determine whether performing the server request exceeds a predetermined number of requests in progress; if performing the server request does not exceed a predetermined number of requests in progress, estimate a completion time for the server request; insert the server request and the completion time in a request queue; and send the server request and a time to live field to a server. The time to live field is equal to the completion time minus a current time that the server request is sent to the server.

In other features, when determining whether performing the server request exceeds a predetermined number of requests in progress, the throttling application is configured to at least one of: determine whether a total number of requests in progress is less than a first predetermined limit; and determine whether a number of server requests in progress is less than a second predetermined limit.

In other features, the server request is sent to the computing device by the first application installed on a second computing device that is remote from the computing device.

In other features, a first application is stored by the memory, is executed by the processor, and is configured to generate the server request. The throttling application is located in a kernel portion of an operating system of the computing device.

In other features, when the request is ready to be sent from the request queue, the throttling application is configured to send a header packet including an offset field, a length field and the time to live field to the server; and to not send a write data payload corresponding to the header packet to the server.

In other features, when the server request is a server write request, the memory of the computing device is directly read by the server based on the header packet.

In other features, when the server request is a server read request, the memory of the computing device is directly written to by the server based on the header packet.

In other features, estimating the completion time for the server request is determined based on data involved in responding to the server request and a data per unit time throttle limit. The data per unit time throttle limit includes at least one of a constant data limit and a burst data limit during a predetermined burst periods.

In other features, when estimating the completion time of the server request, the throttling application is configured to update a prior completion time of a last completed request to current time if the prior completion time is in the past; and add a completion time for the server request to the prior completion time.

In other features, when estimating the completion time of the server request, the throttling application is configured to add a completion time for the server request to the prior completion time if the prior completion time is in the future.

In other features, the throttling application is further configured to receive a response to the server request from the server; and when the completion time for the server request is in the future, wait until the completion time is now and then indicate request completion to the first application.

A method for throttling server requests from a completion side includes, in response to a server request from a first application, determining whether performing the server request exceeds a predetermined number of requests in progress; if performing the server request does not exceed a predetermined number of requests in progress, estimating a completion time for the server request; inserting the server request and the completion time in a request queue; and sending the server request and a time to live field to a server. The time to live field is equal to the completion time minus a current time that the server request is sent to the server.

In other features, determining whether performing the server request exceeds a predetermined number of requests in progress includes at least one of determining whether a total number of requests in progress is less than a first predetermined limit; and determining whether a number of server requests in progress is less than a second predetermined limit.

In other features, when the request is ready to be sent from the request queue, the method further includes sending a header packet including an offset field, a length field and the time to live field to the server; and not sending a write data payload corresponding to the header packet to the server.

In other features, estimating the completion time for the server request is determined based on data involved in responding to the server request and a data per unit time throttle limit. When estimating the completion time of the server request includes one of: updating a prior completion time of a last completed request to current time if the prior completion time is in the past and adding a completion time for the server request to the prior completion time; or adding a completion time for the server request to the prior completion time if the prior completion time is in the future.

A computing device comprises a processor and memory. A host operating system includes a user portion and a kernel portion. A virtual machine is located in the user portion of the host operating system and includes a first application. A throttling application that is executed by the processor and that is located in the kernel portion of the host operating system is configured, in response to a server request from the first application, to: determine whether performing the server request exceeds a predetermined number of requests in progress; if performing the server request does not exceed a predetermined number of requests in progress, estimate a completion time for the server request; insert the server request and the completion time in a request queue; and send the server request and a time to live field to a server. The time to live field is equal to the completion time minus a current time that the server request is sent to the server.

In other features, the server includes a server application stored on the memory that is executed by the processor and that is configured to at least one of read data from and write data to a hard disk drive system based on the server request.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Systems and methods for client-side throttling according to the present disclosure perform a majority of the throttling work on the completion side. The client computing device or client is allowed to send requests beyond what the throttle allows. However, the requests are completed within the limits of the throttle.

The systems and methods for client-side throttling according to the present disclosure are suitable for systems in which the request takes minimal resources as compared to the resources consumed to actually process the request. In other words, the initial request sent from the client to the server is very small and takes very little resources in the system. It is only when the server decides to actually do the work that resources are consumed.

In some examples, when an input/output type request in which a substantial amount of data is moved between machines, the systems and methods described herein take advantage of the property of Remote Direct Memory Access (RDMA). RDMA allows the server to directly push/pull data to/from the memory of the client. The systems and methods described herein can also take advantage of trusted and untrusted components of a client. For example, the trusted components of the client include those portions of the operating system that are inaccessible to the client application. For example, trusted and untrusted components may be created by using virtual machines (VMs). For example, the customer's application running in the VM is an untrusted component. However, a component such as a throttle application running in a kernel of the host operating system is a trusted component.

By allowing the client to send requests to the server that will not be completed until much later in time, the systems and methods described herein allow the server to better prioritize its work. If the server has spare resources at any moment, the server can complete requests early knowing that the trusted component on the client will not actually release the request to the user application until allowed by the throttle. This effectively allows the server to see into the future and, therefore, operate more efficiently.

In some examples described herein, an untrusted user application on the client sends requests to a trusted component (such as a throttle application running in a kernel of the operating system at the client or a trusted server), which communicates with the server handling the request. The client has a throttle limit set for the user application. The throttle may be expressed in megabytes of data per second (MB/s), input output operations per second (IOPS) or other data limit per unit of time. The client may also have one or more limits on the total number of requests that can be outstanding at any point in time. For example, a first limit may relate to requests that are sent to the server and that are uncompleted by the server. For example, a second limit may relate to a total number of requests that are waiting to be indicated as complete to the user application.

The trusted component determines whether the total number of requests outstanding is greater than a total requests in progress count. In some examples, the total requests in progress include requests sent to the server that are uncompleted and/or requests that are completed but waiting to be indicated as completed. If the limit is exceeded, the trusted component waits for a request in a progress queue to complete. The trusted component may also determines whether the number of outstanding requests at the server is greater than a server requests in progress count. At this point, the trusted component can send the request to the server, but the trusted component determines the time when the request should complete based on the allowed MB/s throttle for the application.

To accomplish the MB/s throttle, the trusted component keeps track of the furthest time in the future at which a last previously issued request will complete. If the time stored by the trusted component is in the past, the new request can complete relative to the current time (i.e. "now"). As such, the time stored by the client is updated to be "now" or the current time. If the time stored by the trusted component is in the future, the new request will complete relative to the last completion time.

The amount of time required to complete the request based on the throttle is calculated by the trusted component. For example, if the client is allowed 100 MB/s and the request is for 1 MB, the request will take 10 ms to complete. The request time is added to the last completion time stored above, and the request is assigned the time (corresponding to the absolute time on the trusted component when the server request should complete). The request is then added to the progress queue in the trusted component and sent to the server.

When the request is sent to the server, the current time of the client is subtracted from the absolute time at which the request should complete (corresponding to a time to live (TTL) field for the server request). Note that the reason for not using absolute time is that the clocks on different machines cannot be guaranteed to be synchronized. While relative times are used when communicating between machines, absolute times can also be used.

When the request is received, the server knows how much time it has to process the request via the TTL field. The server can sort multiple requests from multiple clients based on the relative times that the server requests need to complete. The server can then perform the work in an optimal manner. The server is free to complete a request before the TTL expires, thereby freeing up resources on the server and allowing the server to process other requests. The server can trust the trusted component and rely on the fact that the trusted component will not actually indicate completion to the application until the actual completion time arrives.

When a completion notification for a request is received, the trusted component searches the completion queue to locate the entry corresponding to the request. The trusted component checks the absolute time that the server request is scheduled to complete. If that time is "now" or in the past, the trusted component immediately indicates the completion to the user application. If the completion time is in the future, the trusted component waits until that time arrives, then indicates the completion to the user application. The trusted component decrements the count of requests that are in progress.

Note that systems and methods described herein can be implemented with a completely untrusted client as well. In that case, the client-side portion described above as being part of the trusted component is implemented on a server ahead of the normal server-side logic.

Figure 2:
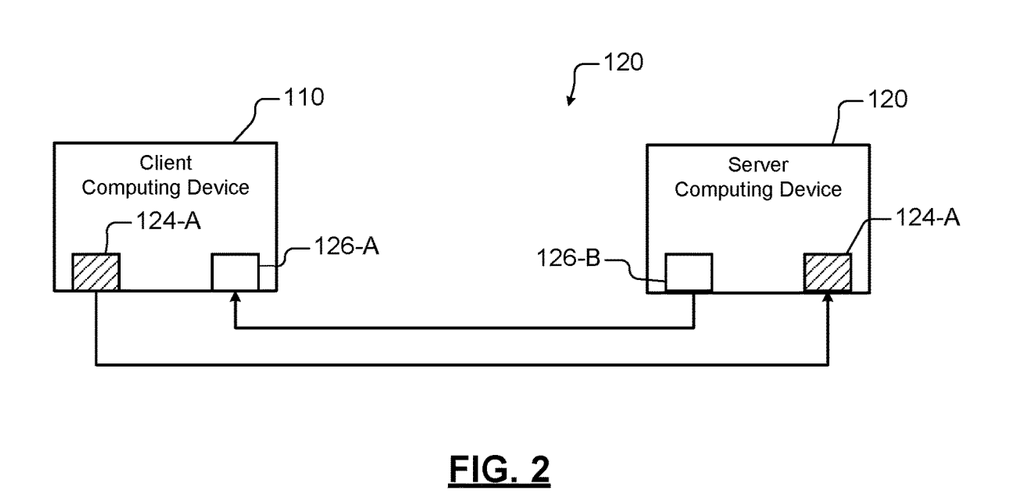
FIG. 2 is a functional block diagram of a client-server network including completion-side throttling according to the present disclosure.

Referring now to FIG. 2, a client-server network 122 including completion-side throttling is shown. In the past, client throttling was performed at 124-A or 124-B on the request side. In contrast, client throttling according to the present disclosure is performed at 126-A or 126-B on the completion side.

Figure 3:
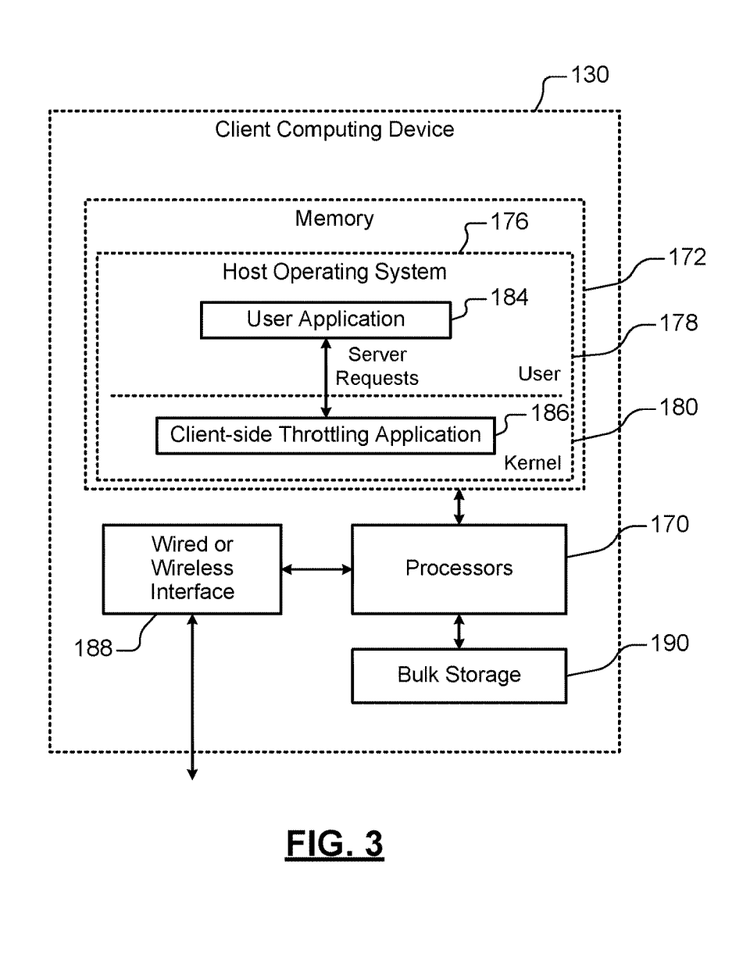
FIG. 3 is a functional block diagram of an example of a client computing device including a client-side of a completion-side throttling application.

Referring now to FIG. 3, a client computing device 130 including a client-side portion of a completion-side throttling application is shown. The client computing device 130 includes one or more processors 170 and memory 172. The memory 172 includes a host operating system 176, which includes a user portion 178 and a kernel portion 180. A user application 184 that generates requests for the server is located in the user portion 178 of the host operating system 176. A client-side portion of a completion-side client throttling application 186 is located in the kernel portion 180 of the host operating system 176. The client computing device 130 further includes a wired or wireless interface 188 and a bulk storage device 190 such as a hard disk drive or other bulk storage device.

Figure 4:
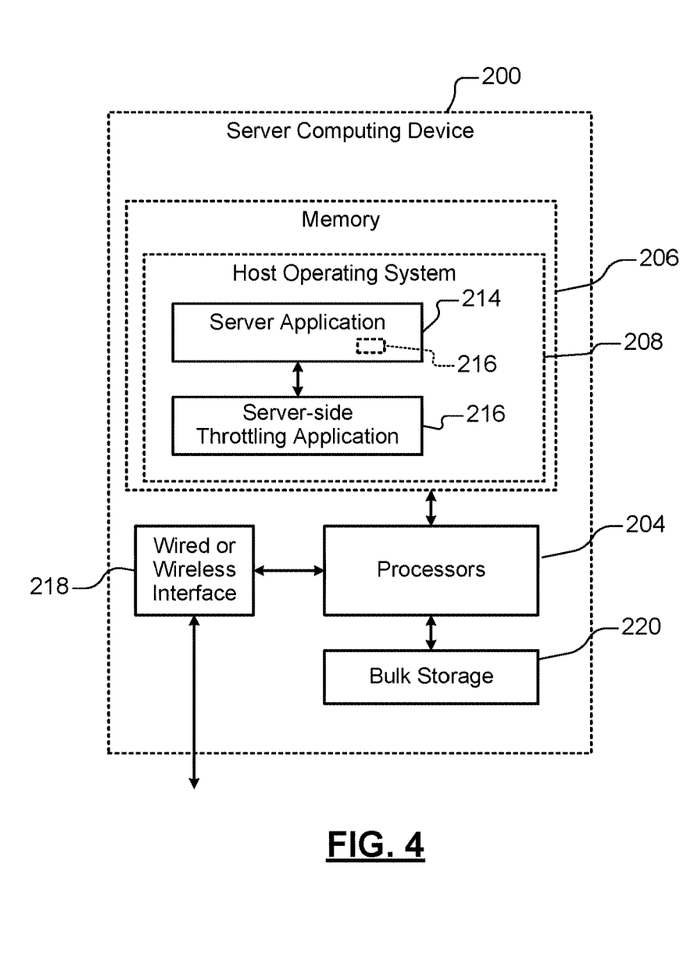
FIG. 4 is a functional block diagram of an example of a server computing device including a server-side of a completion-side throttling application.

Referring now to FIG. 4, a server computing device 200 including a server-side portion of a completion-side throttling application is shown. The server computing device 200 includes one or more processors 204 and memory 206. The memory 206 includes a host operating system 208, which includes a server application 214 that processes the client requests and a server-side portion of a completion-side client throttling application 216. In some examples, the server-side portion of the throttling application 216 is integrated with or provided as an add-in to the server application 214. The server computing device 200 further includes a wired or wireless interface 218 and a bulk storage device 220 such as a hard disk drive or other bulk storage device.

Figure 5:
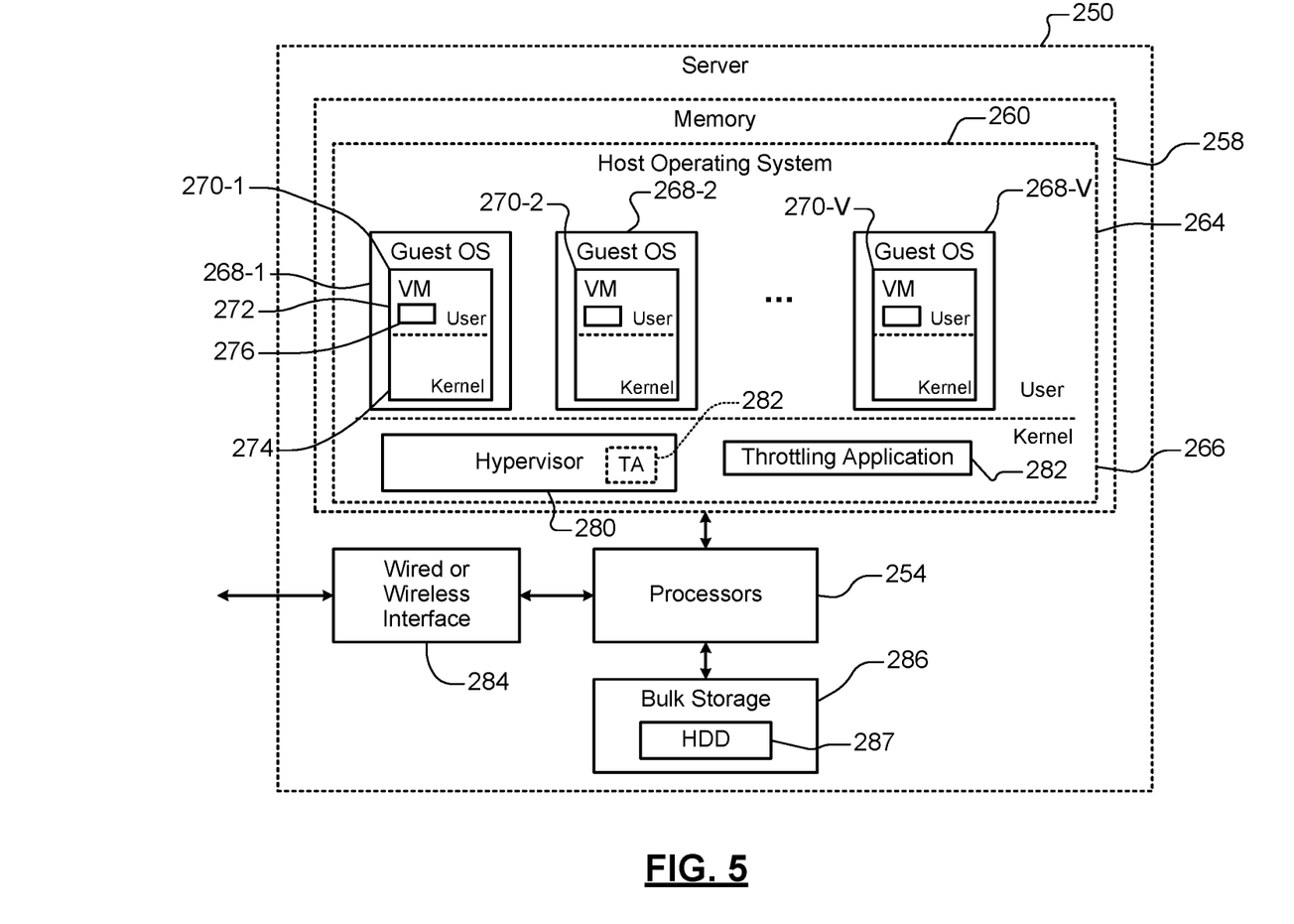
FIG. 5 is a functional block diagram of an example of a server including virtual machines or containers acting as client computing devices and a throttling application.

Referring now to FIG. 5, a server computing device or server 250 includes virtual machines (VMs) or containers acting as client computing devices that generate requests and include a completion-side throttling application. The server computing device 250 includes one or more processors 254 and memory 258. A host operating system 260 includes a user portion 264 and a kernel portion 266. The user portion 264 includes one or more guest operating systems 268-1, 268-2, . . . , and 268-V (collectively guest operating systems 268), where V is an integer greater than zero. Each of the one or more guest operating systems 268-1, 268-2, . . . , and 268-V (collectively guest operating systems 268) hosts a virtual machine or container 270-1, 270-2, . . . , and 270-V (collectively virtual machines (VMs) or containers 270). Each of the VMs or containers 270 includes or is associated with a user portion 272 and a kernel portion 274.

Each of the VMs or containers 270 includes a user application 276 located in the user portion 272 or the kernel portion 274 that generates server requests that are output to a server. The kernel portion 266 of the server 250 includes a hypervisor 280 that controls or virtualizes shared use of system resources such as the processors, hard disk drives, memory, etc. The kernel portion 266 of the host operating system of the server 250 includes client-side and server-side portions of the throttling application 282. Alternately, the server-side portion of the throttling application 282 can be located in the hypervisor 280. The server 250 further includes a wired or wireless interface 284 and bulk storage 286.

Figure 6:
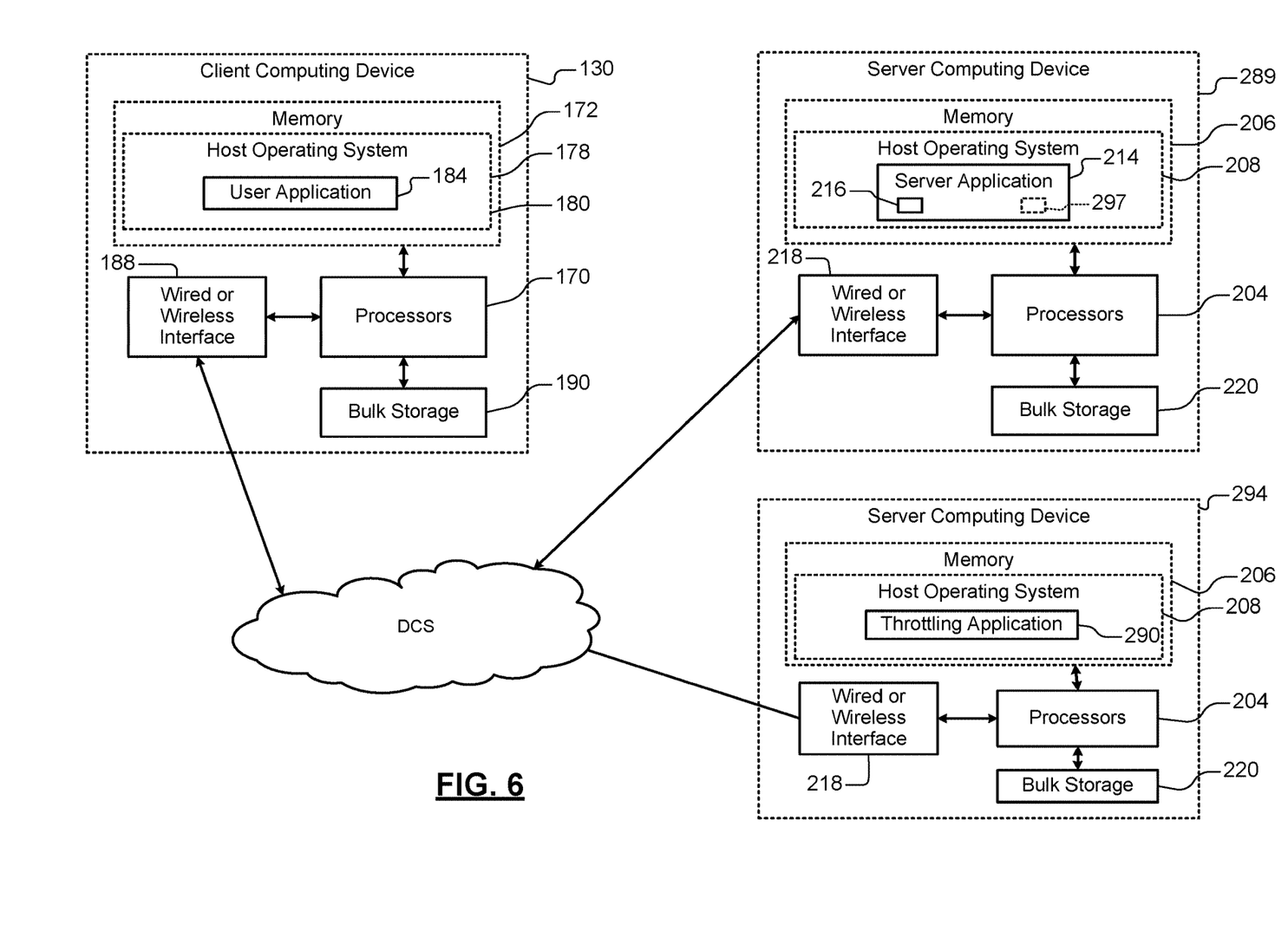
FIG. 6 is a functional block diagram of a system including a client computing, a trusted server computing device, and a server computing device according to the present disclosure.

Referring now to FIG. 6, the throttling application can be located on a computer remote from the client computing device 130 and/or the server 289 including the server application 214 handling the server requests. In one example, a client-side portion of a throttling application 290 is located on a trusted server computing device 294 that is remote from the server 289. The server requests are generated by the client computing device 130 and sent to the trusted server computing device 294. The client-side portion of the throttling application 290 operates as described above to send server requests to the server 298 and receive completion notifications from the server 289. In another example, a throttling application 297 including both client-side and server-side portions is located on the server 289 and the server 294 is omitted.

Figure 7:
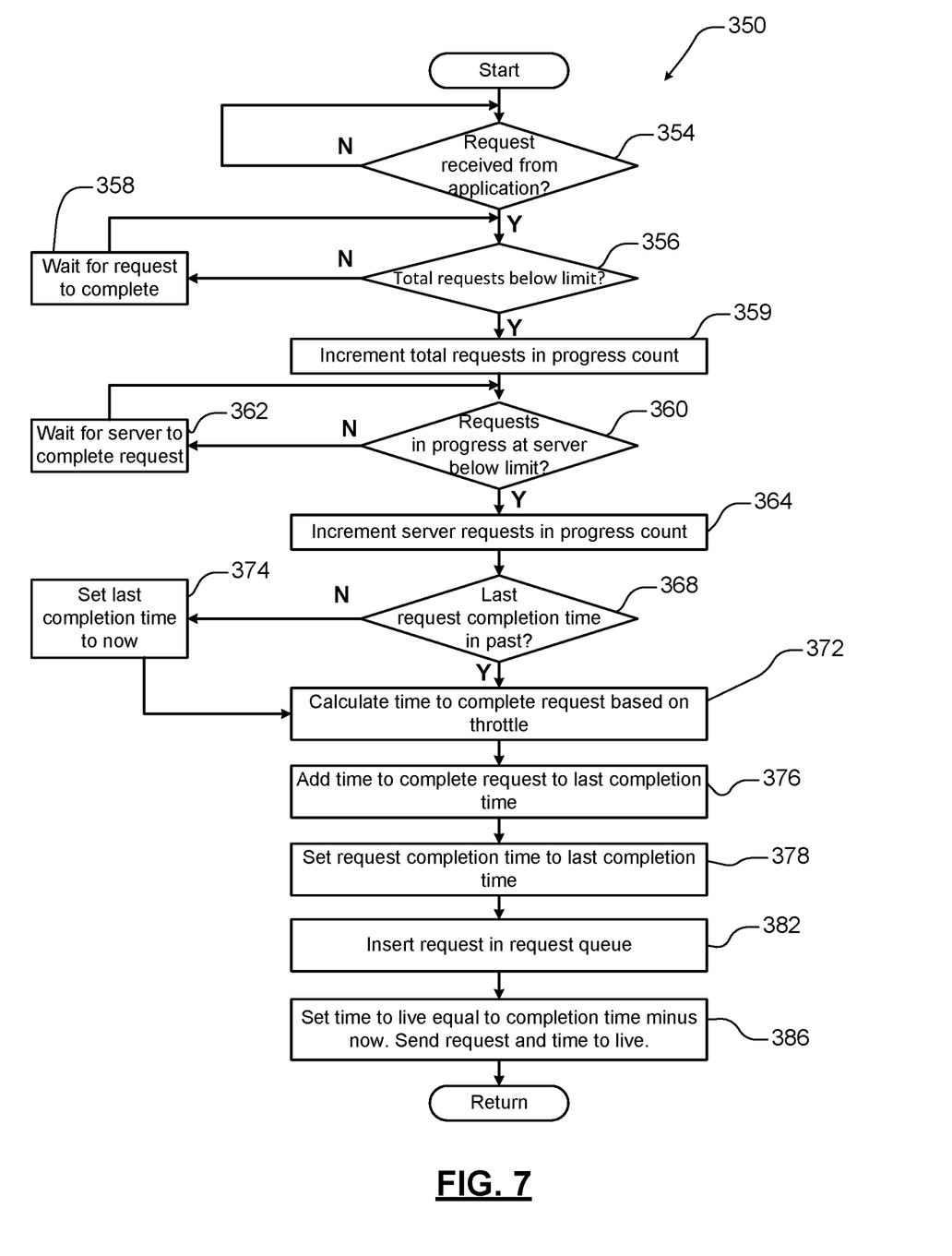
FIG. 7 is a flowchart illustrating an example of a first portion of a completion-side throttling application according to the present disclosure.

Referring now to FIG. 7, a method 350 for performing completion-side throttling when sending the server requests is shown. At 354, the completion-side throttling application determines whether a request is received from the client user application. When 354 is true, the completion-side throttling application determines whether a total number of requests in progress count (including requests in progress on the server and uncompleted requests in a completion queue waiting to be indicated as complete to the user application) is below a predetermined request limit at 356. If 356 is false, the completion-side throttling application continues at 358 and waits for at least one of the requests to complete and then returns to 356.

When 356 is true, the completion-side throttling application increments a total requests in progress count at 359. At 360, the method determines whether the total requests in progress count at the server is below the second predetermined limit. If 360 is false, the method continues with 362 and waits for the server to complete a request and continues at 360. When 360 is true, the method increments the server requests in progress count.

At 368, the completion-side throttling application determines whether a last request completion time is in the past. If 368 is true, the completion-side throttling application calculates time to complete the request based on the throttle at 372. If 368 is false, the last completion time is set equal to "now" at 374 and then continues at 372. At 376, the completion-side throttling application adds time to complete the request to the last completion time. At 378 the completion-side throttling application sets the request completion time to the last completion time. At 382, the completion-side throttling application inserts the request into the request queue. At 386, the client-side portion of the completion-side throttling application sends a request to the server and sets time to live equal to the completion time minus "now".

Figure 8:
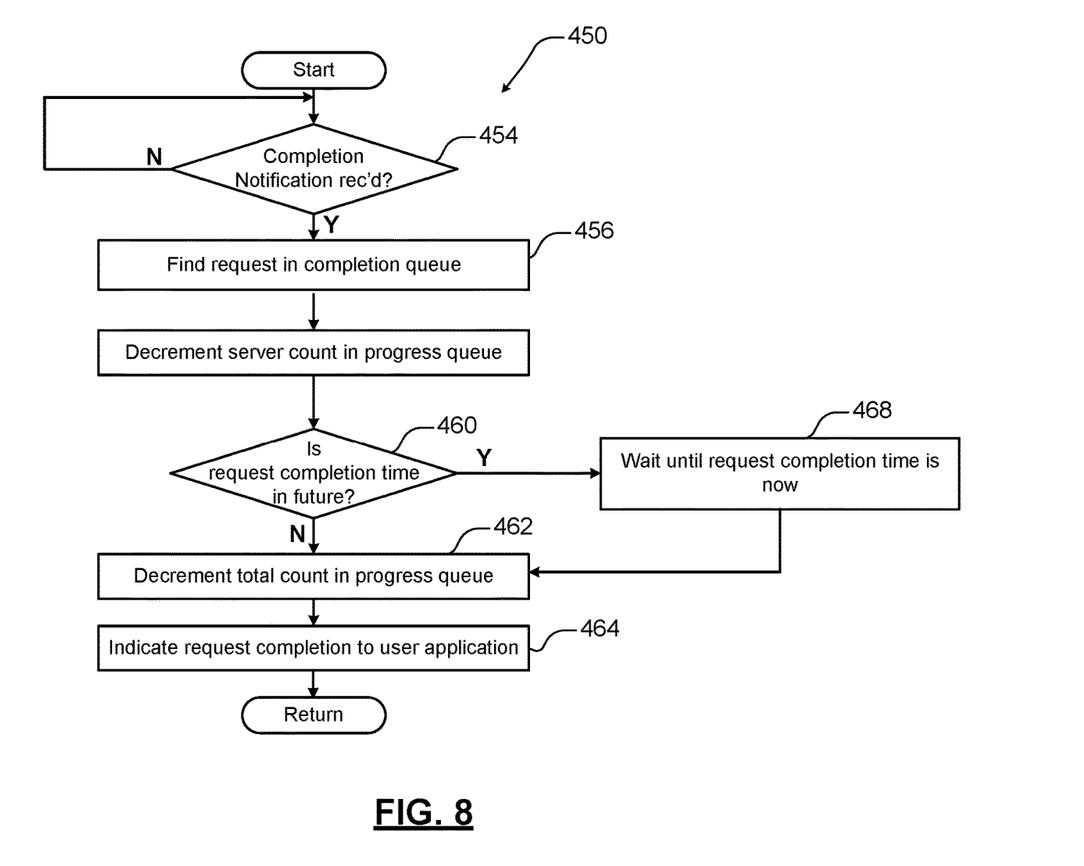
FIG. 8 is a flowchart illustrating an example of a second portion of a completion-side throttling application according to the present disclosure.

Referring now to FIG. 8, a method 450 for performing completion-side throttling after the server completes the server request is shown. At 454, the completion-side throttling application determines whether it has received a completion notification at 454 When 454 is true, the completion-side throttling application finds the request in the completion queue at 456. At 460, the completion-side throttling application determines whether the request completion time is in the future. If 460 is false, the completion-side throttling application decrements the count in the progress queue at 462. If 460 is false, the completion-side throttling application waits until the request completion time is now at 468 and then continues at 462. At 464, the completion-side throttling application indicates request completion to the user application at 464.

Figure 9:
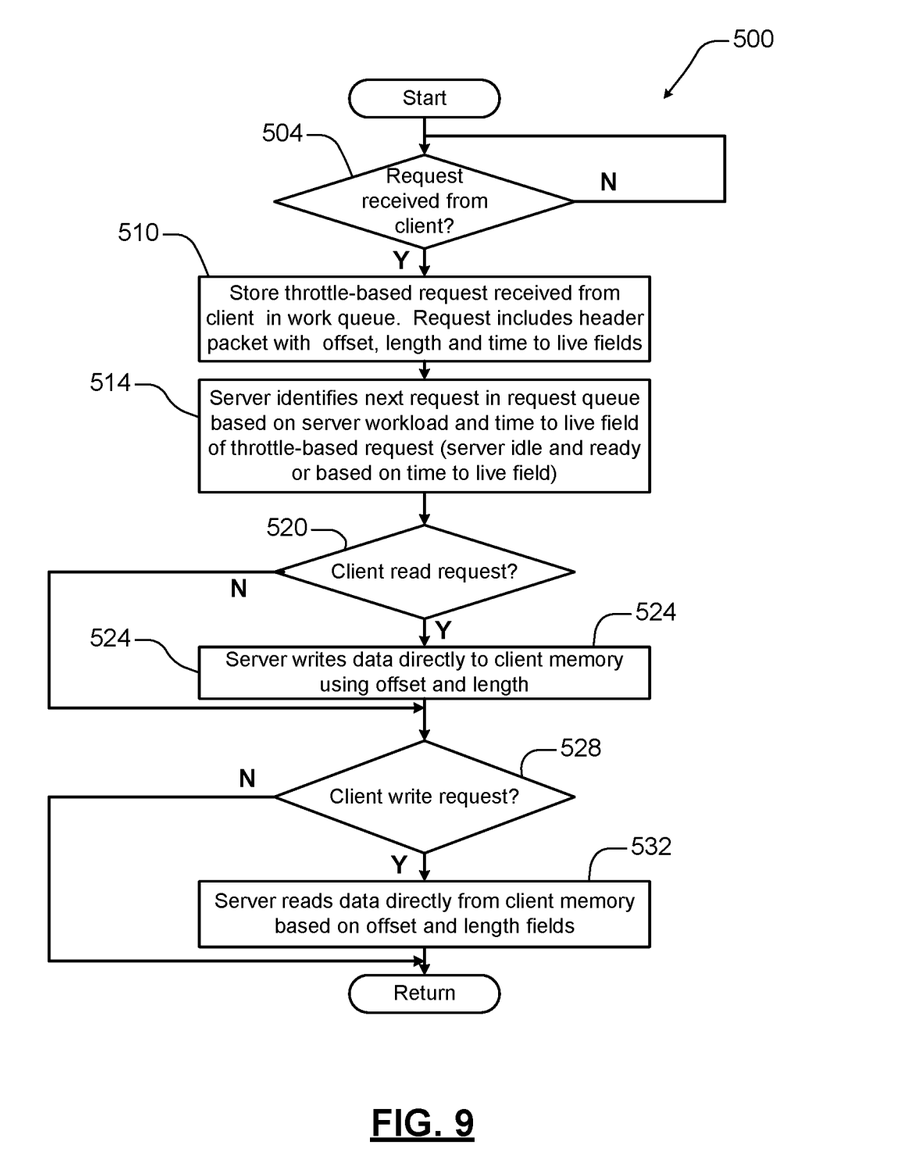
FIG. 9 is a flowchart illustrating a server-side throttling application according to the present disclosure.

Referring now to FIG. 9, a method 500 for performing read and write requests by the server-side throttling application is shown. Operation of the server-side throttling application can be adjusted due to the fact that the trusted component sending the request and receiving the completion notification is trusted. Therefore, the server side can complete the server request and send the completion notification early if that is efficient for the server. When the client has a write request as determined at 504, the client sends a header packet (but not a data payload) including a write offset field, write length field and time to live field to the server at 508. At 512, the server determines whether the completion time is now. In some examples, the server may be idle and may decide to handle the write request earlier than the completion time (in other words the completion time is in the future). The trusted component waits until the completion time is now before letting the user application in the client know that the server write request is complete.

If 512 is true, the server reads write data stored in the client memory based on the header information provided by the client at 516. In some examples, the server uses remote direct memory access (RDMA) to read the payload data from the client memory that the client would like written based upon the header packet.

If the client needs to perform a read request at as determined at 520, the client sends a header packet including read offset, read length and time to live fields to the server. At 528, when the server is ready or completion time is now, the server writes data directly to the client memory based on the read offset and read length fields in the header. In some examples, the server may be idle and may decide to handle the read request earlier than the completion time (in other words the completion time is in the future). The trusted component waits until the completion time is now before letting the user application in the client know that the server read request is complete.

In some examples, the systems and methods perform a majority of throttle enforcement on the completion side rather than the request side. The delay of request completion can be used to put backpressure on the requester and prevent new requests from being issued until existing ones complete. The server is aware ahead of time about requests that do not need to be processed until later in time and can plan accordingly.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as JavaScript Object Notation (JSON), hypertext markup language (HTML) or extensible markup language (XML), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The invention claimed is:
1. A computing device comprising:
a processor;
memory; and a throttling application stored in the memory, the throttling application comprising instructions executable by the processor to:
  receive a server request from a first application;
  estimate a completion time for the server request,
  insert the server request and the completion time in a request queue, and
  when the server request is to be sent to a server, determine a time to live for the server request and send the time to live and the server request to the server, the time to live comprising information regarding how much time the server has to process the request and being determined based upon the completion time minus a current time that the server request is sent to the server.

2. The computing device of claim 1, wherein the instructions are further executable to, prior to estimating the completion time, determine whether performing the server request would exceed a predetermined number of requests in progress, and not estimate the completion time, insert the server request into the request queue, and send the server request if performing the server request would exceed the predetermined number of requests in progress.

3. The computing device of claim 2, wherein the instructions are executable to determine whether performing the server request would exceed the predetermined number of requests in progress by at least one of
  determining whether a total number of requests in progress is less than a first predetermined limit, and
  determining whether a number of server requests in progress is less than a second predetermined limit.

4. The computing device of claim 1, wherein the first application is local to the computing device.

5. The computing device of claim 4, wherein the throttling application is located in a kernel portion of an operating system of the computing device.

6. The computing device of claim 1, wherein the instructions are executable to, when the request is ready to be sent from the request queue:
  send a header packet including an offset field, a length field and the time to live to the server; and
  not to send a write data payload corresponding to the header packet to the server.

7. The computing device of claim 6, further comprising instructions executable to, when the server request is a server write request, permit the memory of the computing device to be directly read by the server based on the header packet.

8. The computing device of claim 6, further comprising instructions executable to, when the server request is a server read request, permit the memory of the computing device to be directly written to by the server based on the header packet.

9. The computing device of claim 1, wherein the instructions are executable to estimate the completion time for the server request based on data involved in responding to the server request and a data per unit time throttle limit.

10. The computing device of claim 9, wherein the data per unit time throttle limit includes at least one of a constant data limit and a burst data limit during a predetermined burst period.

11. The computing device of claim 1, wherein the instructions are executable to, when estimating the completion time of the server request,
  update a prior completion time of a last completed request to the current time if the prior completion time is in the past, and
  add a request time for the server request to the prior completion time.

12. The computing device of claim 11, wherein the instructions are executable to, when estimating the completion time of the server request, add the request time for the server request to the prior completion time if the prior completion time is in the future.

13. The computing device of claim 1, wherein the instructions are executable to:
  receive a response to the server request from the server, and
  when the completion time for the server request is in the future, wait until the completion time is reached, and then indicate request completion to the first application.

14. A method for throttling server requests from a completion side, the method comprising:
  receiving a server request from a first application;
  in response to receiving the server request from the first application,
    determining whether performing the server request exceeds a predetermined number of requests in progress; and
    if performing the server request does not exceed the predetermined number of requests in progress, then estimating a completion time for the server request, inserting the server request and the completion time in a request queue,
    when the server request is to be sent to a server, determining a time to live for the server request, the time to live comprising information regarding how much time the server has to process the request and being determined based upon the completion time minus a current time, and
    sending the time to live and the server request to the server.

15. The method of claim 14, wherein determining whether performing the server request exceeds the predetermined number of requests in progress includes at least one of
  determining whether a total number of requests in progress is less than a first predetermined limit; and
  determining whether a number of server requests in progress is less than a second predetermined limit.

16. The method of claim 14, wherein, when the request is ready to be sent from the request queue, the method further includes:
  sending a header packet including an offset field, a length field and the time to live to the server, and
  not sending a write data payload corresponding to the header packet to the server.

17. The method of claim 14, wherein estimating the completion time of the server request includes
  updating a prior completion time of a last completed request to the current time if the prior completion time is in the past and adding a request time for the server request to the prior completion time, or
  adding the request time for the server request to the prior completion time if the prior completion time is in the future.

18. A computing device including:
  a processor;
  memory;
  a host operating system including a user portion and a kernel portion;
  a virtual machine located in the user portion of the host operating system that includes a first application;
  a throttling application that is executable by the processor, that is located in the kernel portion of the host operating system and that is configured, in response to a server request from the first application, to:
determine whether performing the server request exceeds a predetermined number of requests in progress;
if performing the server request does not exceed the predetermined number of requests in progress, estimate a completion time for the server request;
insert the server request and the completion time in a request queue; and
when the server request is to be sent to a server, determine a time to live for the server request and send the server request and the time to live to the server, wherein the time to live is determined based upon the completion time minus a current time that the server request is sent to the server.

19. The computing device of claim 18, wherein the throttling application is further configured to, when estimating the completion time of the server request,
update a prior completion time of a last completed request to the current time if the prior completion time is in the past, and
add a request time for the server request to the prior completion time.

20. The computing device of claim 18, wherein the throttling application is further configured to, when estimating the completion time of the server request, add a request time for the server request to a prior completion time if the prior completion time is in the future.

* * * * *